US007830365B2

(12) United States Patent
Karhiniemi et al.

(10) Patent No.: US 7,830,365 B2
(45) Date of Patent: Nov. 9, 2010

(54) SENSORS

(75) Inventors: Marko Karhiniemi, Espoo (FI); Juhani Tuovinen, Espoo (FI); Jari Nousiainen, Espoo (FI)

(73) Assignee: Nokia Corporation, Espoo (FI)

( * ) Notice: Subject to any disclaimer, the term of this patent is extended or adjusted under 35 U.S.C. 154(b) by 950 days.

(21) Appl. No.: 11/449,434

(22) Filed: Jun. 7, 2006

(65) Prior Publication Data

US 2007/0285398 A1      Dec. 13, 2007

(51) Int. Cl.
*G06F 3/041* (2006.01)
(52) U.S. Cl. .................................... 345/173; 178/18.01
(58) Field of Classification Search ......... 345/173–178; 178/18.01–18.11
See application file for complete search history.

(56) References Cited

U.S. PATENT DOCUMENTS

| 6,756,973 | B2 * | 6/2004 | Sano et al. ................. 345/177 |
| 7,079,120 | B2 * | 7/2006 | Katsuki et al. ............. 345/177 |
| 2003/0011577 | A1 * | 1/2003 | Katsuki et al. ............. 345/173 |
| 2003/0234773 | A1 * | 12/2003 | Sano et al. ................. 345/177 |
| 2004/0104827 | A1 * | 6/2004 | Katsuki et al. ................. 341/34 |
| 2005/0041018 | A1 | 2/2005 | Philipp ........................ 345/178 |
| 2005/0073505 | A1 * | 4/2005 | Katsuki et al. .............. 345/173 |
| 2007/0273560 | A1 * | 11/2007 | Hua et al. ..................... 341/33 |

FOREIGN PATENT DOCUMENTS

WO    WO 2004/027593 A2    4/2004

OTHER PUBLICATIONS

Classical Electrodynamics, Third Edition, 1998, Jackson, John David, Chapter 7, Plane Electromagnetic Waves and Wave Propagation, pp. 295-340.

* cited by examiner

*Primary Examiner*—Bipin Shalwala
*Assistant Examiner*—Sosina Abebe
(74) *Attorney, Agent, or Firm*—Harrington & Smith

(57) ABSTRACT

A sensor includes a rectangular conductive sheet. Electrical connectors are connected at each corner of the sheet. A number of non-conductive features, e.g. apertures, are formed in this sheet. In one embodiment, V-shaped features extend from near the corners of the sheet towards the centre of the sheet and then turn towards an adjacent corner. Smaller V-shaped features reside in the area between the larger features and the closest edge of the sheet. In another embodiment, a spider web formation of conductive tracks or paths is provided. This provides hardware correction of pincushion error. It reduces or eliminates the need for software correction of pincushion error.

13 Claims, 4 Drawing Sheets

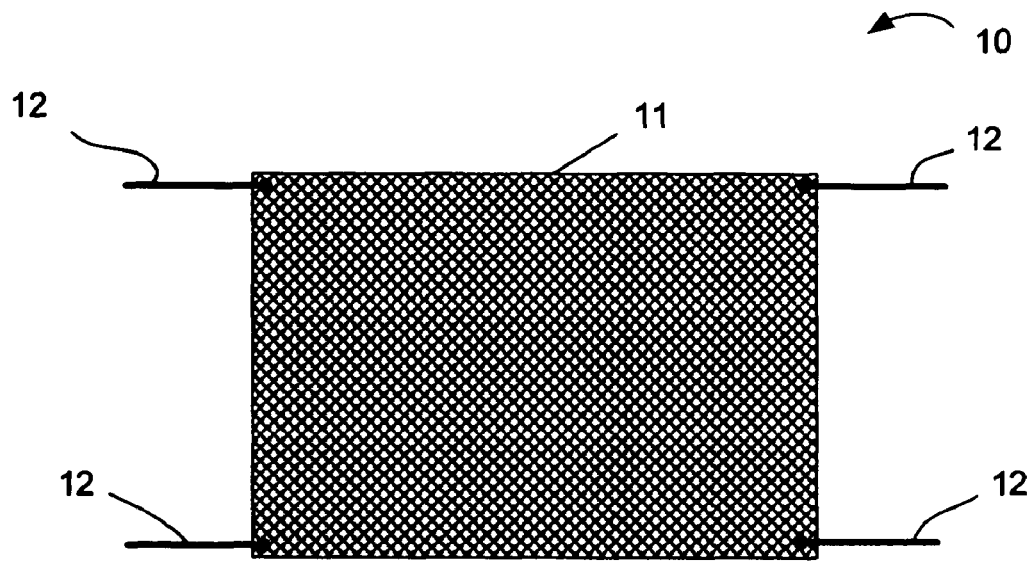
Figure 1 – PRIOR ART
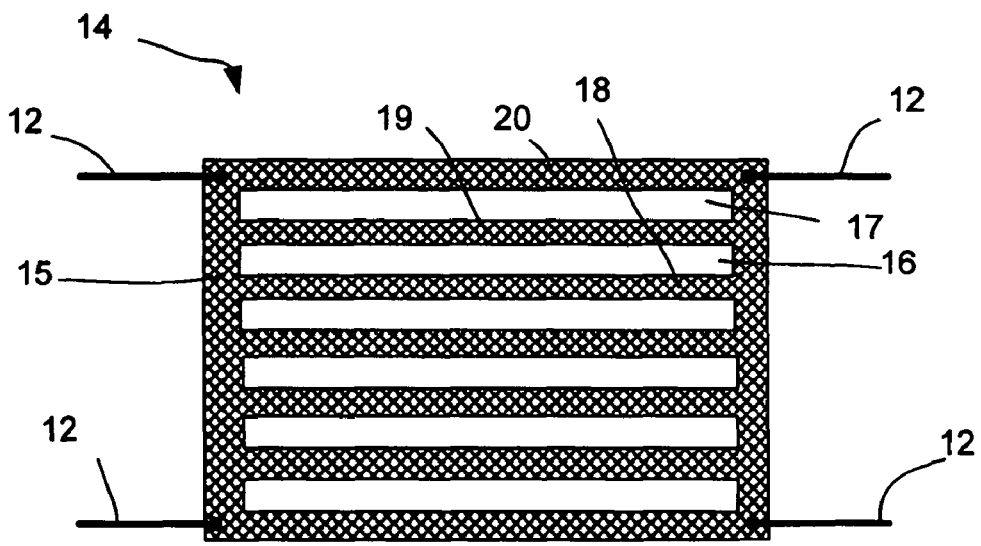
Figure 2 – PRIOR ART

SENSORS

FIELD OF THE INVENTION

This invention relates to a sensor.

BACKGROUND TO THE INVENTION

Touch pads are well known, especially for portable devices such as laptop computers and mobile telephones. A touch pad is an input device, and includes a sensor and associated circuitry. When a user moves a stylus or finger to touch a part of the touch pad, that contact affects the sensor and is detected by the circuitry. There are various mechanisms for detecting the point of contact on the touch pad.

One such mechanism is shown in FIG. 1. This sensor 10 utilises a rectangular conductive sheet 11 with an electrical connection 12 at each corner thereof. The conductive sheet 11 is made of homogenous graphite paper.

The conductive sheet 11 is resistive. When a stylus or finger contacts the conductive sheet 11, the resistance at the contact point is changed, so the capacitance (and thus impedance) between two different ones of the electrical connections 12 is changed. To determine the location on the conductive sheet at which the stylus or finger is placed, some measurements are made. There are a number of options for making measurements. In one technique, two adjacent electrical connections 12 are shorted. Then, an AC (alternating current) charge pulse is applied to one of the electrical connections 12 and signal measurements are made at the other two relevant electrical connections (there is no need to measure both of the electrical connections 12 which are shorted together). Afterwards, the shorted electrical connections 12 are disconnected and the opposite two electrical connections 12 are shorted. The measurement process is then repeated with this particular arrangement. From the measurements, one coordinate of the stylus or finger position can be calculated. Next, two other adjacent electrical connections 12 are shorted, and the measurement process repeated. After this, the opposite electrical connections 12 are shorted and the measurement process is repeated.

Signal measurements are used to infer charge distribution, which is dependent on the applied charge pulses and the finger location. Thus, finger location can be determined from the signal measurements. The signal measurements can be made either using a certain charge level as a trigger calculating the number of triggered events with a given time-interval, or by fixing a time interval and determining the charge level at the end of the time period to a reference capacitance value.

In another technique, AC pulses are applied at a corner and measurements are made at the other corners.

In a further technique, AC pulses are applied at all four corners simultaneously.

The application of AC pulses, the current measurement and the position calculation functions are performed by an integrated circuit (IC) such as one of the products vended by Quantum Research Group of Southampton, UK. The position calculations depend on what AC pulse application technique is used.

Sensors such as that shown in FIG. 1 tend to suffer from so-called pincushion error. Pincushion error is greatest at the midpoints of the edges of the sensor 10, and is lowest at the midpoint of the sensor and at the corners of the sensor. Pincushion error results because of loss of charge to corners opposite the edge that the finger is near. Thee pincushion error is greatest at the midpoints of edges because the relative impedance is greatest there; the distance (and thus impedance) between the finger location and the closest corner is not much less than the distance (impedance) between the finger location and an opposite corner.

Since pincushion error produces location errors, it can be inconvenient for a user since the input device may register an input different to that intended. This is particularly inconvenient with touch screen devices, although it is inconvenient also for touch pads and the like.

Pincushion error can be corrected in software. However, software pincushion error correction does not enhance measurement resolution near the corners of the sensor 10, and position measurement accuracy thus is sub-optimal. Furthermore, relatively complex algorithms are needed to make pincushion error corrections, and this provides a burden on processing resources and, significantly, increases power consumption.

FIG. 2 illustrates a prior art sensor 14 which addresses the problem of pincushion distortion in hardware. The sensor 14 is a homogenised carbon sheet, as with the FIG. 1 sensor. The sheet 15 includes plural elongate apertures therein. Two such apertures are labelled at 16 and 17. The apertures 16, 17 extend parallel to one another and parallel to two sides of the rectangle that constitutes the sheet 15. The apertures 16, 17 extend for most of the length of the sheet 15, but leave material such that each corner is connected directly to each adjacent corner by a respective straight track of carbon sheet. The apertures 16, 17 define tracks which run parallel to two sides of the sheet 15. Three such tracks are labelled at 18, 19 and 20. The length of the conductive path between a mid-point of the uppermost side and an adjacent corner (and thus the impedance therebetween) is significantly shorter than the length of the conductive path between the mid-point of the uppermost side and an opposite corner. Thus, charge either takes a longer path to travel to the opposite corner, or a capacitive connection is formed between adjacent stripes. These factors result in the sensor 14 suffering from less pincushion error with a finger located near the uppermost edge. The same effect applies with a finger located at the bottommost edge. Pincushion error is however only slightly reduced with finger locations near the side edges of the sensor 14.

The invention was made in this context.

SUMMARY OF THE INVENTION

According to a first aspect of the invention, there is provided a sensor comprising a rectangular conductive component with non-conductive features within the conductive component, the non-conductive features defining conductive tracks in the conductive component such that a point adjacent each edge on the sensor is connected by the conductive tracks to corners opposite to the edge only via corners at ends of the edge.

A sensor constructed according to the invention can be made to include hardware pincushion error correction in two dimensions. This is advantageous since it obviates or at least reduces the need for software correction, and thus the associated processing resource use and power consumption.

Preferably the non-conductive features are apertures in the conductive area. This allows simple manufacture of the sensor since it avoids the need for a composite component. The apertures may be approximately the same width as conductive tracks defined by adjacent apertures.

The non-conductive features may define conductive tracks extending in generally straight lines between opposite corners of the sensor. This allows opposite corners to be electrically connected to one another, thereby providing sensitivity to finger location near the centre of the sensor, but without contributing to providing pincushion error.

Preferably the non-conductive features form a spider's web of conductive tracks. This can allow a particularly good arrangement with good sensitivity but without suffering significant pincushion error. The non-conductive features may form, in each of four quadrants each quadrant being defined by the corners at the ends of an edge and the centre of the sensor, stripes running generally parallel to the respective edge. This provides a particularly good arrangement with good sensitivity but with reduced pincushion error compared to the above-discussed prior art.

Preferably the non-conductive features are generally straight.

Alternatively, the non-conductive features can be generally V shaped. Advantageously two ends of each non-conductive feature can be located adjacent a common edge of the sensor. Two non-conductive features may be arranged one within the other and each of the two non-conductive features may have two ends adjacent a common edge of the sensor. These features allow one or more bounded conductive paths to be formed extending between opposite corners of a generally rectangular area, allowing finger detection at locations in the area between the edges and the central portion of the sensor whilst giving rise to reduced pincushion error.

In an arrangement where two ends of each non-conductive feature are located adjacent a common edge of the sensor, two or more non-conductive features preferably are adjacent each edge of the sensor. This can give rise to bounded conductive tracks extending generally parallel to imaginary lines intersecting opposite corners and thus can contribute to effective pincushion error correction.

According to a second aspect of the invention, there is provided a method of producing a sensor, the method comprising providing a rectangular conductive component with non-conductive features within the conductive component, the non-conductive features defining conductive tracks in the conductive component such that a point adjacent each edge on the sensor is connected by the conductive tracks to corners opposite to the edge only via corners at ends of the edge.

Embodiments of the present invention will now be described by way of example only with reference to the accompanying drawings.

BRIEF DESCRIPTION OF THE DRAWINGS

In the drawings:

FIG. 1 is a schematic drawing of a conventional sensor;

FIG. 2 is a schematic drawing illustrating a known sensor, which includes pincushion error compensation in one dimension;

DETAILED DESCRIPTION OF THE PREFERRED EMBODIMENTS

Figure 3:
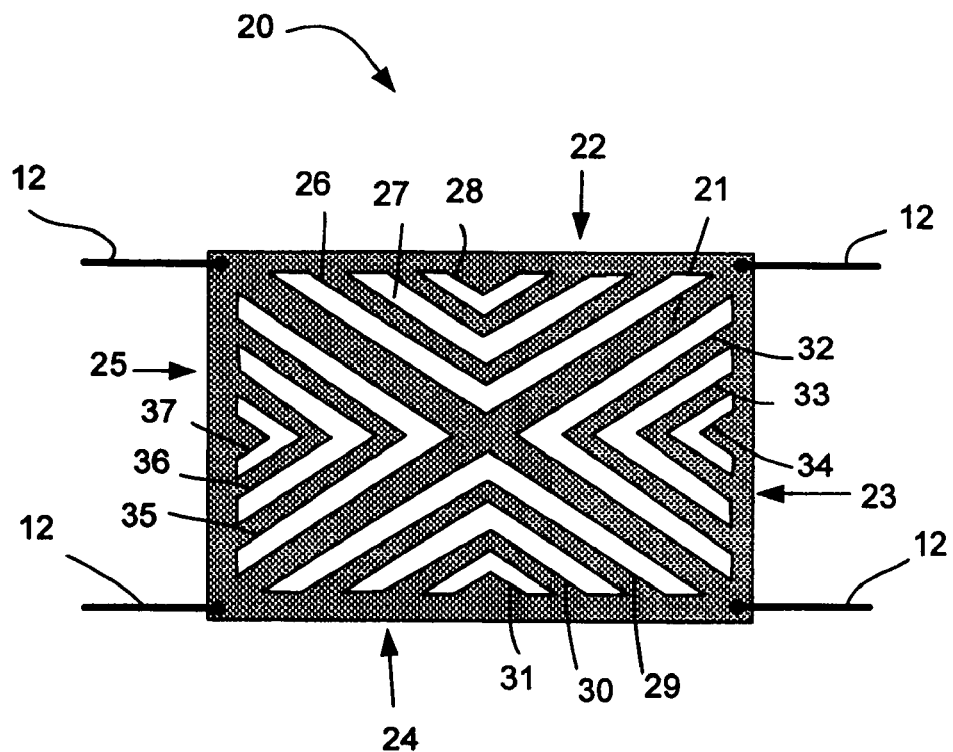
FIG. 3 is a schematic drawing illustrating a first embodiment of a sensor according to the invention.

Referring to FIG. 3, a sensor 20 includes a conductive sheet 21. The conductive sheet 21 is formed of homogenised carbon paper, and thus is resistive. The resistive sheet 21 is in many ways the same as that illustrated in FIG. 1, and reference numeral 12 is again used to denote electrical connections at the corners of the sheet 21. The conductive sheet 21 is rectangular in shape. In this example, the conductive sheet 21 is approximately 40 mm by 50 mm. The conductive sheet 21 includes first to fourth edges 22 to 25.

Formed adjacent the first edge 22 are first to third features 26, 27 and 28. The features 26 to 28 are elongate apertures present in the conductive sheet 21. The features 26 to 28 thus constitute features having infinite resistance. Put another way, the features are non-conductive. Thus, an electrical charge requiring to be moved from one side of the feature to another side of the feature must move around an end of the feature.

The first feature 26 is a V-shaped feature. One end of the feature 26 extends from a position near the first edge 22, and in particular from near where the first edge 22 meets the fourth edge 25. A first limb of the feature 26 extends from this point to a point which is near the geometric centre of the conductive sheet 21. A second limb of the feature 26 extends from the end of the first limb to a point which is near the junction of the first and second edges 22 and 23 of the conductive sheet 21. Since the limbs of the first feature 26 are straight lines, the feature 26 is V-shaped. The ends of the features 26 are separated from the first edge 22 by a small distance such that charge is able to move around the ends of the feature 26.

A second feature 27 is the same shape as the first feature 26, although it is smaller in size. Ends of the second feature 27 are located a distance from the first edge 22 of the conductive sheet 21 equal to the distance between the ends of the first feature 26 and from the first edge 22. The second feature 27 is located further from the junctions of the first and second edges 22, 23 and the first and fourth edges 22, 25 than are the ends of the first feature 26. Thus, the second feature 27 can be said to be contained wholly within an area formed by the first feature 26 and the first edge 22. The first limbs of the first and second features 26, 27 are substantially parallel to one another. The second limbs of the first and second features 26, 27 are substantially parallel to one another. Thus, the first and second features 26, 27 form a bounded conductive path which extends first in one direction then in a different direction. Because of the locations of the first and second features 26, 27, the bounded conductive track extends approximately parallel to an imaginary line intersecting opposite corners of the sheet 21, and then approximately parallel to an imaginary line intersecting the other corners of the sheet 21.

The third feature 28 is the same shape as the first and second features 26, 27, although it is smaller in size than the second feature 27. The ends of the third feature 28 are located a distance from the first edge 22 of the conductive sheet 21 equal to the distance between the ends of the first and second features 26 and 27 and the first edge 22. The third feature 28 is located wholly within an area defined by the second feature 27 and the first edge 22. The first limbs of the second and third features 27, 28 are substantially parallel to one another. The second limbs of the second and third features 27, 28 are substantially parallel to one another. Thus, the second and third features 27, 28 form a bounded conductive path which extends first in a direction approximately parallel to an imaginary line intersecting opposite corners of the sheet 21, and then in a direction approximately parallel to an imaginary line intersecting the other corners of the sheet 21.

The first, second and third features 26 to 28 are symmetrical about an imaginary line which is perpendicular to the first edge 22 of the conductive sheet 21 and which intersects the first edge 22 at its mid-point.

The features 26 to 28 have a width approximately equal to the distance between adjacent features.

Fourth, fifth and sixth features 29, 30 and 31 are located adjacent the third edge 24. The fourth to sixth feature 29 to 31 have substantially the same arrangement as the first to third features 26 to 28. The fourth to sixth feature 29 to 31 are located relative to the second to fourth edges 23 to 25 of the conductive sheet 21 in a manner substantially corresponding to that with which the first to third features 26 to 28 are located with respect to the first, second and fourth edges 22, 23 and 25. Thus, the fourth to sixth features 26 to 28 are symmetrical about an imaginary line extending perpendicular to the third edge 24 and intersecting the third edge 24 at its mid-point.

Seventh to ninth features 32, 33 and 34 are located adjacent the second edge of the conductive sheet 21. The seventh feature 32 is larger than the eighth feature 33, which is larger than the ninth feature 34. The seventh to ninth features 32 to 34 have substantially the same arrangement as the first to third features 26 to 28. The seventh to ninth features 32 to 34 are arranged relative to the first to third edges 22 to 24 of the conductive sheet 21 similarly to the manner in which the first to third features 26 to 28 are arranged with respect to the first, second and fourth edges 22, 23 and 25. However, since the second edge 23 is shorter than the first edge 22, the angle at which the limbs of the seventh feature 32 meet each other is shallower than the angle at which the limbs the first feature 26 meet each other. Also, the distance between the ends of the limbs of the seventh feature 32 is less than the distance between the ends of the limbs of the first feature 26. The ends of the seventh to ninth features 32 to 34 are separated from the second edge 23 by an amount substantially equal to the distance between the ends of the first to third features 26 to 28 and the first edge 22. However, the distance between the junction of the limbs of the first feature 32 and the midpoint of the second edge 23 of the conductive sheet 21 is slightly greater than the distance between the junction of the limbs of the first feature 26 and the midpoint of the first edge 22. This allows the seventh feature 32 to extend to a point near to the centre point of the conductive sheet 21. However, as can be seen from the Figure, the first feature 26 extends slightly closer to the centre point of the conductive sheet 21 than does the seventh feature 32. This allows a conductive path to be formed between opposite corners of the conductive sheet 21 and for the path to be bounded for most of its length (except a portion around its mid-point) and to be straight and of constant width.

Tenth, eleventh and twelfth features 35, 36 and 37 are arranged with respect to the fourth edged 25 of the conductive sheet 21 in a manner corresponding to the arrangement of the seventh to ninth features 32 to 34 with respect to the second edge 23.

The sheet 21 constitutes a rectangular conductive component with non-conductive features 26 to 37 within the conductive component, the non-conductive features defining conductive tracks in the conductive component 21 such that a point adjacent each edge 22 to 25 on the sensor 20 is connected by the conductive tracks to corners opposite to the edge only via corners at ends of the edge.

The FIG. 3 sensor by the arrangement of the first to twelfth features 26 to 37 gives rise to pincushion error correction by the construction of the sensor 20 itself. This arises because the features form bounded conductive tracks which restrict the movement of charge where such contributes to pincushion error. In particular, in respect of a finger located at a point adjacent an edge, the conductive paths to the corners of the sheet 21 are limited. Charge can pass directly from the point on the edge to the corners at the ends of that edge. Thus, the impedance between those corners, which can be termed adjacent corners, and the finger location are relatively low. For charge to pass between the finger location and the corners at the ends of the opposite edge, which can be termed opposite corners, the charge primarily must pass firstly via an adjacent corner. This means that the impedance between the finger location and the opposite corners is relatively high. In practice, there is some capacitive coupling through the gaps between adjacent strips, but this is relatively small, second order effect. Since the ratio of the impedance between the finger position and the adjacent corners and the impedance between the finger location and the opposite corners is quite high, pincushion error is reduced. This applies to all of the edges 22 to 25. The amount of pincushion error correction provided by the sensor 20 at the top and bottom edges thereof is slightly less than that provided at the corresponding edges of the FIG. 2 sensor but is significantly greater at the left and right edges than that provided at the corresponding edges of the FIG. 2 sensor. Nonetheless, the sensor 20 is considered to be better for most applications than is the FIG. 2 sensor.

Figure 4:
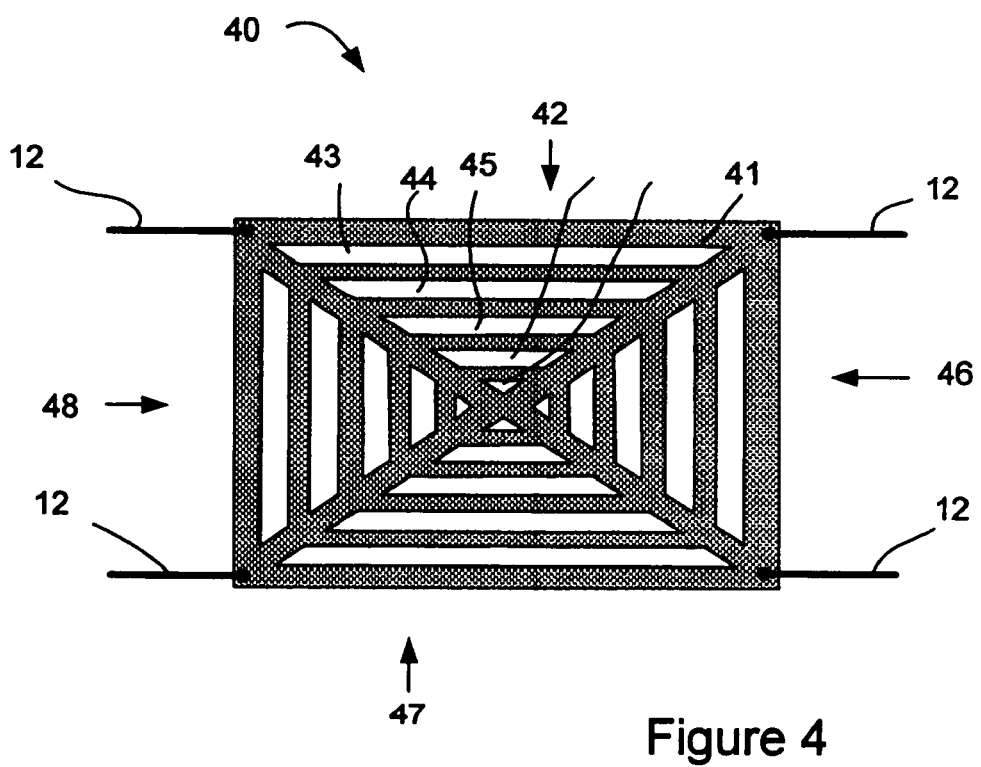
FIG. 4 is a schematic drawing illustrating a second embodiment of a sensor according to the invention.

A second embodiment of a sensor 40 in accordance with the invention is shown in FIG. 4. Here the sensor comprises a conductive sheet 41, having approximately the same dimensions as the conductive sheet 21 of the FIG. 3 sensor. Electrical connections 12 are formed at each corner of the conductive sheet 41. Associated with a first edge 42 of the conductive sheet 41 are first to fifth linear features, three of which are labeled at 43, 44 and 45. The features are parallel to one another. The features are generally straight.

The first feature 43 is longer than the second feature 44, which is longer than the third feature 45. The fourth feature is shorter than the third feature 45, and the fifth feature is shorter again.

Features are formed with respect to second, third and fourth edges 46, 47 and 48 of the conductive sheet 41 in substantially the same way as the first to fifth features 43 to 45 are formed with respect to the first edge 42.

It will be appreciated that the FIG. 4 sensor provides bounded conductive paths extending in four different directions. One path extends between two opposite corners, and a second path extends between the other two opposite corners. These can be termed diagonal paths. A number of paths forming a first group extend parallel to the first edge 42 and connect at their ends to the diagonal paths. These paths are formed wholly within a quadrant defined by the corners at the end of the first edge 42 and the central point of the conductive sheet 41. Members of another group of paths extend parallel to the third edge 47 and are contained wholly within a quadrant defined by the corners adjacent the third edge 47 and the central point of the conductive sheet 41. Members of a third group of paths are correspondingly located with respect to the second edge 46. These paths are perpendicular to the paths of the first and second groups of paths. A fourth group of paths are correspondingly located with respect to the fourth edge 48.

The widths of the conductive paths are about equal to the widths of the non-conductive features.

The sheet 41 constitutes a rectangular conductive component with non-conductive features within the conductive component, the non-conductive features defining conductive tracks in the conductive component 41 such that a point adjacent each edge 42, 46, 47, 48 on the sensor 40 is connected by the conductive tracks to corners opposite to the edge only via corners at ends of the edge.

The FIG. 4 sensor by the arrangement of the non-conductive features gives rise to pincushion error correction by the construction of the sensor 40 itself. This arises because the features form bounded conductive tracks which restrict the movement of charge where such contributes to pincushion error. In particular, in respect of a finger located at a point adjacent an edge, the conductive paths to the corners of the sheet 41 are limited. Charge can pass directly from the point on the edge to the adjacent corners. Thus, the impedance between the adjacent corners and the finger location are relatively low. For charge to pass between the finger location and the opposite corners, the charge must pass firstly via an adjacent corner. This means that the impedance between the finger location and the opposite corners is relatively high. Since the ratio of the impedance between the finger position and the adjacent corners and the impedance between the finger location and the opposite corners is quite high, pincushion error is reduced. This applies to all of the edges 42, 46, 47, 48. Thus, pincushion error correction is provided in x and y directions, as with the FIG. 3 sensor 20. The amount of pincushion error correction provided by the sensor 40 at the top and bottom edges thereof is slightly less than that provided at the corresponding edges of the FIG. 2 sensor but is significantly greater at the left and right edges than that provided at the corresponding edges of the FIG. 2 sensor. Nonetheless, the sensor 40 is considered to be better for most applications than is the FIG. 2 sensor.

Furthermore, the conductive tracks or paths defined by the non-conductive features of the FIG. 4 sensor provide reduced pincushion error without any loss of sensitivity at locations between the edges 42, 46, 47 and 48 and the centre point of the conductive sheet 41. This results from the conductive tracks running parallel to the edges and the meeting of these tracks with tracks extending perpendicularly and towards the edge opposite the edge to which the finger position is nearest.

Instead of the conductive sheets 21, 41 being formed of homogenised carbon paper, they may be comprised of any other suitable material, for instance a heterogeneous conductive material or by a conductive paint. It will be appreciated by the skilled person what materials are suitable for use. Homogenous carbon paper is used in the embodiments merely as an example.

Although currently theoretical, it will be appreciated that the sensor according to the invention can be applied to a three dimensional sensor. Such sensors detect stylus or finger position in three dimensions, whereas the FIGS. 3 and 4 sensors are operable primarily only in two dimensions.

The FIGS. 3 and 4 sensors are operated in substantially the same manner as the FIGS. 1 and 2 sensors. However, pincushion error correction is provided by the structure of the sensor 20, 40 itself, so no software pincushion error correction is needed. This provides an improvement in the sense that less processing resources are required to use the sensors 20, 40 as compared to a conventional sensor with software pincushion error correction. The particular advantages are reduced processor utilisation and lower power consumption.

Although the FIGS. 3 and 4 sensors reduce substantially pincushion error, other sensors falling within the scope of the invention may mitigate pincushion error to a lesser degree. Furthermore, where a sensor according to the invention is used and software pincushion error correction is used, the amount of software correction of the pincushion error needed to provide satisfactory results may be less than that required by the corresponding prior art sensor, potentially resulting in savings in terms of processor use and power consumption.

The FIGS. 3 and 4 sensors require some calculations to be performed in the design phase. In particular, impedance (resistance and capacitance) values for the various possible connections permutations of the electrical connections 12 are required, so that measured values can be equated to finger or stylus. The physics which determines the measurements that results from a given finger or stylus location is described in "Classical Electrodynamics" by John David Jackson, ISBN 0-471-30932-X.

Figures 5, 6:
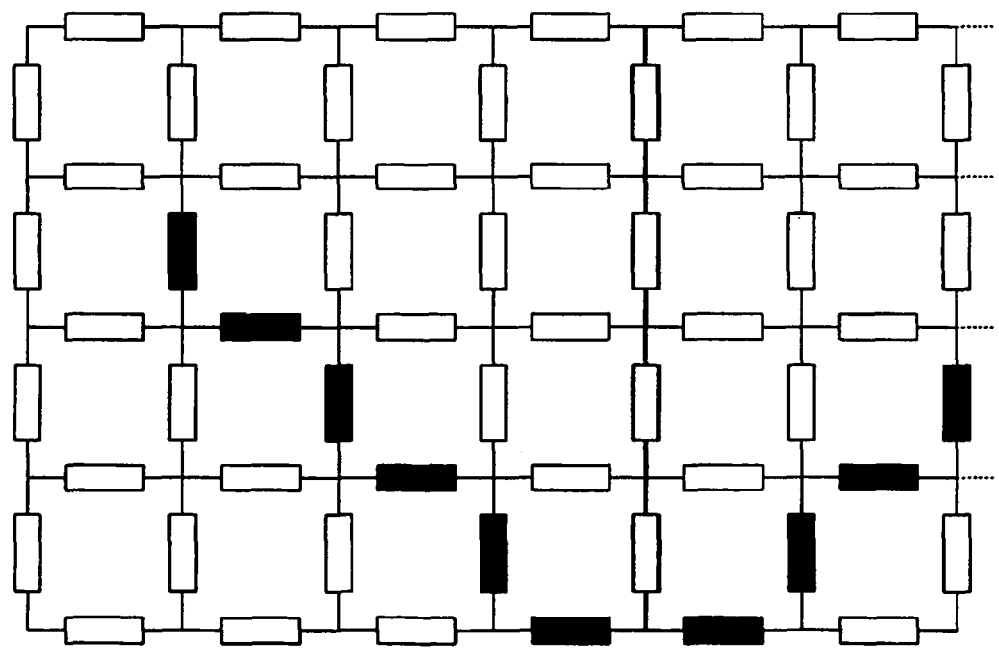
FIGS. 5 and 6 are schematic drawings illustrating how impendence measurement of the FIGS. 3 and 4 sensors can be simulated.

The inventors have found that the response of the sensors 20, 40 can be simulated using an approximation of the impedance provided by the conductive sheets 21, 41. This is illustrated in FIGS. 5 and 6. In FIG. 5, it can be seen that the approximation can be made by way of a number of small, square resistances arranged in a grid. Where one of the non-conductive features is present, a square of the grid has an infinite resistance, and is shown as black in FIG. 5. This allows the sensors to be simulated using a network of resistors such as that shown in FIG. 6. Here, plural resistors having identical values are connected in a grid-like fashion. Where an infinite impedance is required, a relevant one of the resistors is given an infinite or very high value. Such resistors are coloured black in FIG. 6.

This allows the sensors 20, 40 to be simulated with a software application such as Matlab or Aplac.

Pincushion error can further be reduced by using a central portion of the sensor 20, 40, and not using margins near the edges. This can be achieved for instance by folding the edges underneath the central part of the sensor 20, 40, allowing only the central part to be exposed to a user. This folding aspect of the invention can also be used without pincushion correction using non-conductive apertures.

Figure 7:
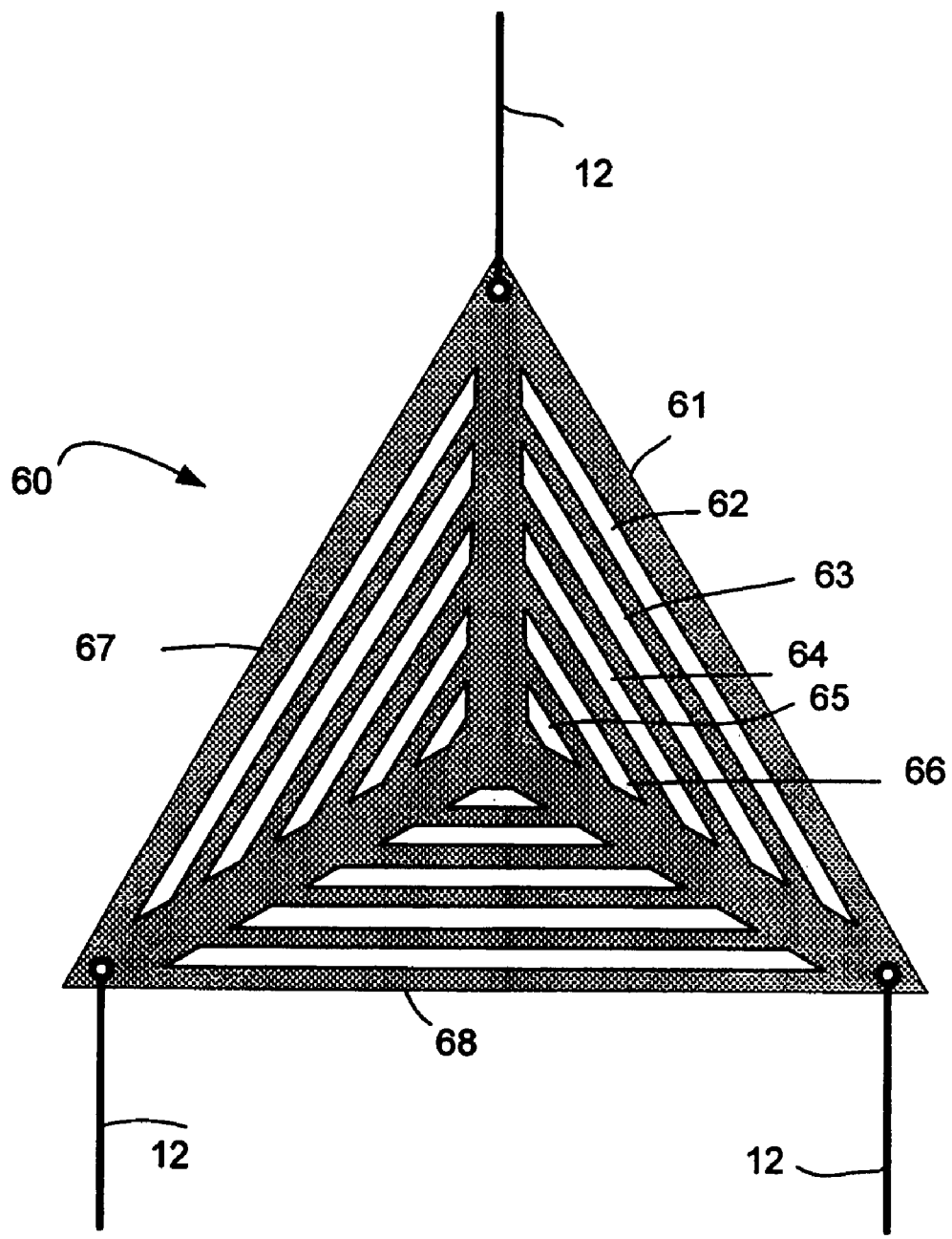
FIG. 7 is a schematic drawing illustrating a third embodiment of a sensor according to the invention.

The sensor need not be rectangular in shape. A triangular sensor embodying the invention is shown in FIG. 7. In FIG. 7, a sensor 60 is shown in the form of a triangle. The sensor 60 comprises a homogenised carbon sheet. Three connectors 12 are provided, one at each corner. Parallel to a first edge 61 are formed first to fifth non-conductive features 62 to 66. The first to fifth non-conductive features 62 to 66 each have a width approximately equal to the separation between adjacent features. Features are arranged with respect to second and third edges 67, 68 in the same manner as the first to fifth non-conductive features 62 to 66 are arranged with respect to the first edge 61.

The non-conductive features define bounded conductive paths. Three radial bounded conductive paths run from respective corners to the geometric centre of the sensor 60. The other bounded conductive paths run parallel to the edge closest to their centre point and join two of the radial bounded conductive paths at their ends. Thus, the non-conductive features define conductive tracks in the sensor 60 such that a point adjacent each edge on the sensor is connected by the conductive paths to a corner opposite to the edge only via corners at ends of the edge.

The invention is applicable to sensors having any polygonal shape.

Although the invention has been described in relation to a small number of embodiments, it will be appreciated that the invention is of considerably broader scope than this.

For example, whilst the non conductive features shown in FIGS. 3 and 4 comprise elongate apertures that define conductive stripes in the sheet 21, alternative structures can be used. For instance, the conductive features can be defined by non conductive particles or non conductive solid inserts embedded in the conductive sheet 21.

Furthermore the sensor does not need to be formed of a conductor of homogeneous material. For example, the resistance of the material in the sensor plane can be non-homogeneous, with conductive and semi-conductive paths that the define the relatively conductive and non conductive features.

The invention is thus defined not by the above described embodiments but by the accompanying claims and their equivalents.

What is claimed is:

1. An apparatus comprising a conductive component with relatively non-conductive features within the conductive component, the conductive component having plural edges including a first edge and a second edge, wherein the first edge adjoins the second edge at a first corner of the conductive component, the relatively non-conductive features defining conductive tracks in the conductive component such that a point on the conductive component adjacent a mid-point of the first edge is connected by the conductive tracks to a second corner of the conductive component only via ends of the first edge, the second corner being opposite to the first edge, and such that a point on the conductive component adjacent a mid-point of a second edge is connected by the conductive tracks to a third corner of the conductive component only via ends of the second edge, the third corner being opposite to the second edge and wherein the apparatus is a sensor.

2. The apparatus as claimed in claim 1, wherein the relatively non-conductive features are apertures in the conductive component.

3. The apparatus as claimed in claim 2, wherein the apertures are approximately the same width as conductive tracks defined by adjacent apertures.

4. The apparatus as claimed in claim 1, wherein the relatively non-conductive features define conductive tracks extending in generally straight lines between opposite corners of the sensor.

5. The apparatus as claimed in claim 4, wherein the relatively non-conductive features form a spider's web of conductive tracks.

6. The apparatus as claimed in claim 5, wherein the relatively non-conductive features form, in each of four quadrants each quadrant being defined by the corners at the ends of an edge and the center of the sensor, stripes running generally parallel to the respective edge.

7. The apparatus as claimed in claim 5, wherein the relatively non-conductive features are generally straight.

8. The apparatus as claimed in claim 1, wherein the relatively non-conductive features are generally V shaped.

9. The apparatus as claimed in claim 8, wherein two ends of each relatively non-conductive feature are located adjacent a common edge of the sensor.

10. The apparatus as claimed in claim 9, wherein two relatively non-conductive features are arranged one within the other and each of the two relatively non-conductive features has two ends adjacent a common edge of the sensor.

11. The apparatus as claimed in claim 9, comprising two or more relatively non-conductive features adjacent each edge of the sensor.

12. The apparatus as claimed in claim 1 wherein the conductive component is rectangular.

13. A method comprising providing a conductive component with relatively non-conductive features within the conductive component, the conductive component having plural edges including a first edge and a second edge, wherein the first edge adjoins the second edge at a first corner of the conductive component, the relatively non-conductive features defining conductive tracks in the conductive component such that a point on the conductive component adjacent a mid-point of the first edge is connected by the conductive tracks to a second corner of the conductive component only via ends of the first edge, the second corner being opposite to the first edge, and such that a point on the conductive component adjacent a mid-point of a second edge is connected by the conductive tracks to a third corner of the conductive component only via ends of the second edge, the third corner being opposite to the second edge, wherein the method is a method of producing a sensor.

* * * * *